United States Patent [19]

Becerra

[11] Patent Number: 5,421,594
[45] Date of Patent: Jun. 6, 1995

[54] GASKET

[75] Inventor: Abel R. Becerra, Lake Jackson, Tex.

[73] Assignee: Marine & Petroleum Mfg., Inc., Houston, Tex.

[21] Appl. No.: 293,571

[22] Filed: Aug. 19, 1994

Related U.S. Application Data

[63] Continuation of Ser. No. 138,881, Oct. 18, 1993, abandoned, which is a continuation of Ser. No. 989,978, Dec. 4, 1992, abandoned, which is a continuation of Ser. No. 655,664, Feb. 14, 1991, abandoned.

[51] Int. Cl.$^6$ ................................................. F16J 9/00
[52] U.S. Cl. ............................... 277/213; 277/207 A; 277/235 A
[58] Field of Search ............... 277/213, 207 R, 207 A, 277/209, 211, 227, 235 R, 235 A, 235 B, 231, 232, 233; 285/910, 368, 917

[56] References Cited

U.S. PATENT DOCUMENTS

| | | | |
|---|---|---|---|
| 222,388 | 12/1879 | Doty | 277/213 |
| 854,135 | 5/1907 | Whittemore | 277/231 |
| 922,130 | 5/1909 | Goetze | 277/213 |
| 1,030,055 | 6/1912 | Darlington | 277/213 |
| 3,841,289 | 10/1974 | Meyers | 277/233 |
| 3,903,959 | 9/1975 | Fushimi et al. | |
| 3,926,539 | 12/1975 | Lamm | |
| 4,083,570 | 4/1978 | Sugawara | |
| 4,116,451 | 9/1978 | Nixon et al. | |
| 4,118,850 | 10/1978 | Owen et al. | |
| 4,121,858 | 10/1978 | Schulz | |
| 4,160,551 | 7/1979 | Nixon et al. | |
| 4,190,257 | 2/1980 | Schnitzler | |
| 4,234,638 | 11/1980 | Yamazoe et al. | |
| 4,299,332 | 11/1981 | Pechacek | |
| 4,333,975 | 6/1982 | Booth | |
| 4,350,346 | 9/1982 | Fowler | |
| 4,394,023 | 7/1983 | Hinojosa | |
| 4,422,894 | 12/1983 | Atkinson et al. | |
| 4,423,544 | 1/1984 | Kashmerick et al. | |

(List continued on next page.)

FOREIGN PATENT DOCUMENTS

| | | | |
|---|---|---|---|
| 0268134 | 5/1988 | European Pat. Off. | 277/235 A |
| 1118630 | 6/1956 | France | 277/209 |
| 0384379 | 12/1932 | United Kingdom | 277/213 |
| 2229047 | 9/1990 | United Kingdom | 277/235 B |

OTHER PUBLICATIONS

Marine & Petroleum Mfg., Inc., original of a two-sided Brochure no date available.
Marine & Petroleum Mfg., Inc., original of a two-sided Heat Exchanger Gasket Brochure no date available.
Durabla ® Manufacturing Company, copy of an eight page brochure no date available.
Copy of a one-page Union Carbide Corporation Specification for Single-ply Corrugated Metal Gaskets no data available.
Original of a two-sided Grafoil ® gasket tape brochure by Union Carbide Corporation no date available.
Copy of a 32 page brochure from Sigri GmbH Sigraflex ® no date available.
Copy of a Durabla ® Manufacturing Company, 12 page brochure no date available.

*Primary Examiner*—Daniel G. DePumpo
*Attorney, Agent, or Firm*—Fish & Richardson

[57] ABSTRACT

This invention relates generally to novel gaskets having continuous multiple seals created by utilizing a core of functionally corrugated material encapsulated by a graphite material such that an interactive relationship exists between the graphite, the functionally corrugated core, and the surfaces to be sealed. Specifically, the present invention relates to fail-safe, ring-type, concentrically corrugated, graphite encapsulated gaskets with continuous, multiple seals creating a multiplicity of parallel, fluid-locked, graphite-densified, barriers for use in the petrochemical industry to seal flange connections. The present invention also relates to fail-safe, concentrically corrugated, graphite encapsulated heat exchanger and internal combustion engine head gaskets with similarly created continuous, multiple seals. A method of manufacture of the gaskets is also disclosed.

6 Claims, 4 Drawing Sheets

U.S. PATENT DOCUMENTS

| | | |
|---|---|---|
| 4,455,334 | 6/1984 | Ogino .............................. 277/235 B |
| 4,465,287 | 8/1984 | Bindel et al. . |
| 4,471,968 | 9/1984 | Schlaupitz et al. ............. 277/235 B |
| 4,485,138 | 11/1984 | Yamamoto ...................... 277/235 B |
| 4,559,248 | 12/1985 | Sumiyoshi et al. . |
| 4,591,170 | 5/1986 | Nakamura et al. . |
| 4,665,978 | 5/1987 | Luke . |
| 4,676,515 | 6/1987 | Cobb .............................. 277/235 B |
| 4,705,278 | 11/1987 | Locacius et al. . |
| 4,709,758 | 12/1987 | Preston, Jr. . |
| 4,723,783 | 2/1988 | Belter et al. . |
| 4,743,421 | 5/1988 | McDowell et al. ............. 277/235 B |
| 4,744,572 | 5/1988 | Sahba et al. . |
| 4,753,443 | 6/1988 | Nicholson . |
| 4,776,602 | 10/1988 | Gallo . |
| 4,795,174 | 1/1989 | Whitlow ......................... 277/235 B |
| 4,796,351 | 1/1989 | Gee . |
| 4,799,956 | 1/1989 | Vogel . |
| 4,810,454 | 3/1989 | Belter . |
| 4,822,062 | 4/1989 | Gallo et al. . |
| 4,872,506 | 10/1989 | Nilsson et al. . |
| 4,892,320 | 1/1990 | Tuckmantel . |
| 4,911,972 | 3/1990 | Mercuri . |

GASKET

This application is a file wrapper continuation of U.S. application Ser. No. 08/138,881, filed Oct. 18, 1993, which is a continuation of U.S. application Ser. No. 07/989,978, filed Dec. 4, 1992, which is a continuation of U.S. application Ser. No. 07/655,664, filed Feb. 14, 1991, all of which are now abandoned.

BACKGROUND OF THE INVENTION

This invention relates generally to novel gaskets having continuous multiple seals created by utilizing a core of functionally corrugated material encapsulated by a graphite material such that an interaction occurs among the graphite, the functionally corrugated core, and the surfaces to be sealed. Specifically, the present invention relates to fail-safe, ring-type, concentrically corrugated, graphite encapsulated gaskets with continuous, multiple seals creating a multiplicity of parallel, fluid-locked, graphite-densified, barriers for use in the petrochemical industry to seal flange connections. The present invention also relates to fail-safe, concentrically corrugated, graphite encapsulated heat exchanger and internal combustion engine head gaskets with similarly created continuous, multiple seals.

In the petrochemical industry there exists a need for a versatile flange gasket and heat exchanger gasket having the following characteristics: continuous, fail-safe operation thereby avoiding potential damage to human health, plant equipment and the surrounding environment; fire resistance; resistance to temperature differentials across the diameter of the gasket; chemical resistance; field ruggedness; positive sealing even when the gasket is misaligned; positive sealing when the gasket material differs in thermal expansivity with respect to the surface to be sealed; environmentally safe, non-asbestos construction; operability at high pressures and temperatures; resiliency, springiness, memory, and structural integrity particularly during thermal cycling from high temperatures to low temperatures and vice versa, thermal shock, or other thermal excursions; low torque requirements for maintaining a positive seal at all operational or accidental temperatures and pressures to avoid subjecting the flanges (or other surface) and flange bolts to warpage and/or other damage; inhibited gasket creep or cold flow; crash resistance to enhance the potential for gasket reusability; minimized extrusion of the gasket coating; and reduced installation and maintenance time.

Furthermore, it is likewise desirable to have a cylinder head gasket having similar characteristics as those set forth above in order to improve engine performance.

Until the gaskets of the instant application, these desired gasket characteristics, in combination, had not been achieved. Whereas existing gaskets to date have demonstrated a level of utility and selected ones of the characteristics noted, no gasket until the present invention has been able to achieve the desired combination of gasket characteristics.

Graphite has long been known to possess properties generally desired for high temperature packing materials. In particular, an expanded form of graphite material such as the flexible expanded graphite material sold under the names "Grafoil ®" (Union Carbide Corporation, U.S. Pat. No. 3,404,061), "Calgraph ®" (Polycarbon, Inc.), "Flexicarb ®" (Flexicarb, Inc., a Flexitallic Gaskets, Limited Company), or "Sigraflex ®" (Sigri GmbH); an inorganic binder-containing expanded graphite material, such as that described in U.S. Pat. No. 4,234,638; or an intercalated graphite material, such as that described in U.S. Pat. No. 4,799,956, have been employed for use in flange gaskets, heat exchanger gaskets, and automobile engine and exhaust gaskets, and the like.

Bare metal corrugated ring gaskets are known in the art for use as flange gaskets for high temperature applications. Bare metal flat gaskets are also known in the art. However, these bare metal gaskets must be precisely aligned, and the flange and gasket surfaces must be virtually flawless (i.e., highly polished and free of scratches and other abrasions) and the flange bolts must be torqued extremely tightly (approximately 150 ft-lbs on a 3", 150 lb flange) to create a positive seal. Therefore, the flange bolts are typically tightened and over-tightened with a relatively high level of torque to achieve positive sealing. Such over-tightening can warp the flanges, damage both the flanges and the bolts, and create the dangerous potential for seal failure. The bare metal corrugated gaskets have spring-like characteristics which give them high memory and structural integrity, in contrast with a flat metal gasket which has no memory or resiliency. However, the memory capability of a bare metal corrugated gasket is limited in extreme temperature or thermal cycling situations. Under conditions such as thermal cycling, thermal excursions, or thermal shock, these bare metal corrugated gaskets, and the other existing gaskets tend to leak. Furthermore, bare metal is highly vulnerable to corrosion, abrasion, scratching or other attack from hostile materials thereby creating potential leak paths and gasket failure.

Spiral-wound gaskets also exist in the art. These gaskets are composed of two materials, for example, a thin profiled metal strip wound into a spiral with an interleaved strip of a sealing material such as Teflon ®, paper, asbestos, or graphite. Spiral-wound gaskets have disadvantages. For example, spiral-wound gaskets have inadequate temperature resiliency when subjected to extreme thermal shocking, excursions or temperature cycling. Spiral-wound gaskets are also abusive to the flanges because they are very difficult to seal and require a relatively high level of torque (as much as 150-160 ft-lbs) be applied to the associated flange bolts. Attempts have been made to enhance the elasticity of a spiral-wound gasket, such as by using the gaskets in tandem, or, as suggested in U.S. Pat. No. 4,796,351, by using annealed high tensile strength, precipitation heat-hardenable alloy steel strip and then heat treating such strip prior to interleaving with the sealing material.

Asbestos gaskets have existed in the art. For example, flat metal, grooved-faced gaskets have been utilized with flanges wherein alternating grooves are filled with asbestos. Asbestos has also been used as a filling material between corrugated sheet metal, metal jackets or spirally wound strips. Also, compressed asbestos sheet material utilizing a rubber binder has been employed in the petrochemical industry as a flange gasket. This asbestos sheet material (such as that sold under the name "Durabla ®" by Durabla Manufacturing Co.) is cut into the desired gasket shape and placed between the flange surfaces. Asbestos fiber has desirable material characteristics for gaskets in that it is impervious to most chemicals and acids, it is wear-resistant, and it has high, but limited, temperature capacity (up to approximately 1,000° F. depending upon the stability of the binder material). However, asbestos gaskets only have limited springiness or memory, thereby increasing the likelihood of seal failure during temperature cycling. Furthermore, due to the environmental health dangers associated with asbestos, such a material is no longer desirable in the industry. Kevlar is the most common replacement for asbestos as a gasket material, but it has a temperature limit of only approximately 450° F.

It is also known in the art that graphite can be applied to the edge or center of gaskets to improve the sealing characteristics of the gasket. For example, a strip of expanded graphite tape has been applied around the edge of a flat metal gasket, or has been utilized directly on the flange surface. As described below, the use of a graphite tape is undesirable. Graphite has also been used to encapsulate thin, flat metal gasket reinforcements, such as those described in U.S. Pat. Nos. 4,333,975 and 4,422,894. However, these flat metal-reinforced graphite gaskets have no resiliency or memory, lack a plurality of seals, and do not possess a means of preventing seal loss due to extrusion of the graphite from the metal reinforcement during operation at high temperatures and pressures. Furthermore, the metal is often perforated or tanged thereby creating leak paths.

The use of a strip or strips of narrow graphite tape (i.e., typically less than one inch width) has been employed on corrugated metal pipe flange gaskets typically having larger than an 18″ diameter. Application of this tape results in covering only a partial planar surface extending from one corrugation apex to an adjacent corrugation apex on only a portion of the corrugated gasket. Thus, the tape surface generally remains flat and parallel to the flange surface, adhering only to the apex portion of the corrugation, but does not extend into the valley areas between each apex. Furthermore, application of this tape to a circular strip of material creates irregularities or flutes in the tape as the tape is bent or folded to conform to the circular shape. This partial application of tape leaves the metal gasket exposed to corrosion, involves non-uniform, non-unitary, distorted, and overlapping application of the graphite to the gasket face, and does not create a plurality of concentrically spaced, parallel, fluid-locked barrier seals. Furthermore, when the adhesive backing carbonizes at high temperature, and the gasket is placed through a series of temperature cycles, the resulting expansion and contraction of the metal can thereby cause stress and loss of adherence at the graphite/apex points of contact, and/or cause the graphite layer expanse between adjacent corrugation apex points to tear. Furthermore, the expanse of graphite material between adjacent corrugation apex points is vulnerable to puncturing, tearing, and cutting during handling, installation, and use. Thus, the application of this tape creates leak paths, and the potential for extrusion of the graphite material and seal failure.

It has also been suggested that a thin rectilinearly embossed iron sheet could serve as a reinforcement for an inorganically bound graphite material, such as in U.S. Pat. No. 4,234,638. However, this thin rectilinear embossment serves only as a thin reinforcement to a thicker graphite seal, and is not believed to be interactive with the surface to be sealed, nor does it prevent extrusion or channelling of the graphite. This arrangement may experience seal failure at high temperature and pressure.

Graphite has also been used with grooved flat metal pipe flange gaskets, such as described in U.S. Pat. No. 4,121,858. However, the grooves in the gaskets function only to help contain the graphite, and are not believed to give the gasket any memory or resilience.

Furthermore, graphite has been used on heat exchanger head gaskets (for example, as a filler material on a double jacketed heat exchanger gasket as set forth in U.S. Pat. No. 4,118,850 and as a single flat surface coating on a heat exchanger gasket as described in U.S. Pat. No. 4,872,506). However, these heat exchanger head gasket seals also require that a relatively high level of torque (up to approximately 150 ft-lbs) be applied to the head bolts to achieve a positive seal, and these heat exchanger gasket seals have no structural memory or resiliency.

Graphite has also been employed in conjunction with the manufacture of internal combustion engine head gaskets and exhaust manifold gaskets, such as those described in U.S. Pat. Nos. 3,926,539; 4,083,570; 4,423,544; 4,465,287; 4,591,170; 4,705,278; 4,723,783; 4,776,602; 4,810,454; 4,822,062; and 4,911,972. Automotive head gaskets typically require that about 90–100 ft-lbs of torque be applied to the associated bolts to achieve a positive seal and are essentially constructed from a flat, thin (e.g., 7 mil.) metal sheet material which has been perforated and subsequently laminated with a graphite material. The metal has perforations and may further include protrusions (or tangs) extending outwardly on one or both sides of the face of the metal. The graphite material is applied to the surface of this perforated or tanged metal and then the gasket is compressed to close the tangs to affix the graphite in place. Problems exist with these gaskets. For example, the perforations and tangs in the metal substrate may provide leak paths. Additionally, the actual perforated metal is believed to be too thin for welding, thereby, creating size limitations for the gasket. Even if one could weld this very thin (e.g., 7 mil.) material to create a large diameter gasket, the material must then be tanged, which again presents difficulties due to the increased size. Furthermore, these tanged, flat gaskets do not have resilience or memory, thereby reducing their effectiveness in high performance, temperature cycling applications.

Graphite has also been employed in conjunction with the manufacture of valve stem seals or stuffing box seals, such as those described in U.S. Pat. Nos. 4,116,451; 4,160,551; 4,190,257; 4,350,346; 4,394,023; 4,744,572; 4,753,443; and 4,892,320.

As noted above, these existing gasket configurations have limitations and are inadequate to accomplish the desired, combined characteristics for flange, heat exchanger and engine head gaskets as set forth herein.

Therefore, in accordance with the present invention, a fail-safe, multi-sealed, interactive gasket system is provided which overcomes or substantially minimizes these and other disadvantages of the gaskets presently known or used in the art.

DEFINITIONS

As used herein, the term "functional corrugations" or "functionally corrugated" refers to corrugations that (1) create a parallel series of ridges and hollows, or a parallel series of ridges and grooves, or a parallel series of peaks and valleys or troughs, or a parallel series of wrinkles or folds; and (2) create memory, springiness, ductility, and resilience in the material being corrugated. The functional corrugations could take on a plurality of "V-inverted V" shapes, "U-inverted U"

shapes, "W-inverted W" shapes, sinusoidal shapes, or other similar shapes or combinations thereof.

As used herein, the term "ring gasket" or "ring seal" refers generally to a gasket or seal taking on the general shape of a ring in that it is essentially a circular strip of gasket material having an inner and outer diameter, and includes functional corrugations in laterally spaced, parallel relationship relative to the inner and outer diameter of the gasket material. The term "ring gasket" or "ring seal", as used herein, also embodies a functionally corrugated, circular strip of gasket material which defines any shape outline, such as, for example, oval, square, rectangular, elliptical, oblong, and/or epicycloid and/or any combination thereof. Furthermore, it will be understood herein that the term "ring gasket" or "ring seal" also contemplates a gasket having an area bounded by an outer border defining any desired shape, and within such bounded area, includes any number or combination of interior borders defining an opening or openings of any shape, wherein the outer border and any of the interior borders of the gasket may be created with functional corrugations in laterally spaced, parallel relationship relative to the respective border.

SUMMARY OF INVENTION

The present invention addresses the problems described above by providing a fail-safe, ring-type, functionally corrugated, graphite encapsulated, zone densifted, energized, multi-seal gasket system for use in, for example, pipe flange and heat exchanger head connections utilized in the petrochemical industry and in engine head gaskets utilized in the automotive industry.

In the gasket system of the present invention, it is important that adequate sealing be applied quickly, continuously, and reliably under all operating conditions and temperatures even in the event of an emergency event, such as, a fire or other external stress on the seal connection. The gasket system is intended to operate as a fail-safe system to help avert serious operating problems.

The present invention provides an especially effective fail-safe gasket system comprising a combination of mechanical, physical, and pressure components all in interactive relationship. This combination is achieved by employing a functionally corrugated core ring gasket having the following physical attributes: tensility, resilience, ductility, compressibility, memory, and springiness. This functionally corrugated core ring gasket is then entirely encapsulated in a graphite sheath having plasticity, elasticity, compressibility, thermal resistivity, chemical resistivity, physiological inertness, high operational reliability and long service life. The graphite sheath is applied in a thickness sufficient to coat the functional corrugations, and to adhere to substantially the entire surface of the gasket, while maintaining the gasket's functionally corrugated contour.

The graphite encapsulated functionally corrugated ring gasket can be installed into a pipeline flange, or other application, with a minimal torque (such as, 30 ft-lbs for a 3", 150 lb flange) applied to the flange bolts sufficient to urge the gasket into a "loaded" static position between the adjacent flange surfaces. This loading action sets the ring gasket's multiple sealing faces into fail-safe sealing relation with the flange surfaces. In the loaded position, the functional corrugations on both faces of the ring gasket form a plurality of parallel, fluid-locked, graphite densifted, barriers to prevent leakage of the flanged pipe connection.

Among the advantages of the present invention are: it is a non-asbestos gasket; it can withstand high pressures; it can withstand high temperatures; it requires relatively low torque to create a positive seal (i.e., only 30 ft-lbs on a 3", 150 lb flange); it is chemically resistant; it is field rugged; it is reusable; it is fire resistant; and it has great resilience, memory and structural integrity (particularly with thermal cycling from high temperatures to low temperatures and vice versa).

An attractive feature of the functionally corrugated, graphite encapsulated ring gasket of this invention lies in its ability to achieve a positive seal without a relatively high level of torque applied to the flange bolts, or other seal bolts with prior art devices. For example, with existing flange gaskets used in the petrochemical industry, typically 150 ft-lbs of torque is required for the bolts on a 3-inch-150 lb flange correction to achieve a positive seal. This typical torquing value places a high level of stress and strain on the flange and flange bolts potentially leading to expensive repairs or seal failure. However, the ring gasket of the present invention overcomes or substantially minimizes these limitations by requiring only approximately 20% (i.e., 30 ft-lbs) of the normal torque presently applied in the industry to achieve a positive seal with existing gaskets. In light of these advantages, the flange bolts last longer; damage to the flanges or other seal surfaces is minimized; and less labor is required for the installation of the ring gaskets and maintenance of the flange connections, thereby creating a long lasting, reliable and fail-safe seal.

For example, a flange which has a 7¼ inch outer diameter is typically constructed with only four bolt holes. This particular size flange is one of the most commonly used, and when employing existing gaskets, too much torque is required to create a positive seal, thereby warping and damaging the flange and the flange bolts. Therefore, the low-torque, graphite encapsulated, functionally corrugated ring gasket of the instant invention overcomes this and other disadvantages.

Even if over-torquing occurs, another built-in advantage of the ring gasket of the present invention is its crush resistance, thereby ensuring performance and enhancing the potential for reusability of the gasket even in situations of over-torquing.

Furthermore, the combined properties of the presently disclosed functionally corrugated core ring gasket and its graphite encapsulation, provide fail-safe operation thereby avoiding potential damage to human health, plant equipment and the surrounding environment. The multi-sealed ring gasket system of the present invention has great fire resistance, which can help avert a catastrophe in the event of a fire external to the seal. The ring gasket of this invention has great chemical resistance by virtue of the graphite encapsulation and the desired degree of chemical resistance of the material selected for the functionally corrugated core gasket. The ring gasket of the present invention also provides field ruggedness due to the rigid construction of the functionally corrugated core gasket and the flexibility of the graphite encapsulation. Positive sealing is possible even when the gasket is misaligned on a flange or other surface, or where such surface is smooth, polished, scratched, rough, pitted, or utilizes an RMS-type finish. The ring gasket of the present invention is also of an environmentally and occupationally safe, non-asbestos construction.

Additionally, as disclosed herein, the combined properties of the parallel, laterally spaced, functional corrugations in the core gasket and the graphite encapsulation of the gasket provide the attributes of fail-safe operability at high pressures and temperatures, particularly during thermal cycling from high temperatures to low temperatures and vice versa. These attributes contribute greatly to the smooth, safe, and time efficient day-to-day operation of the process employing the ring gaskets or ring seals of the present invention.

The ring gasket design of the present invention also inhibits gasket creep or cold flow. The plurality of parallel, barrier seals created by the functional corrugations on the core gasket, and the corrugation-contoured graphite encapsulation of such core gasket, minimize extrusion of the graphite coating on the gasket, thereby preventing a seal blow-out.

The article of the present invention can be generally described as a functionally corrugated core ring gasket which has been encapsulated by a graphite material such that a functionally corrugated contour remains. The functionally corrugated core gasket ring itself is typically constructed of metal material, preferably stainless steel. The selection of the metal may depend upon the metallurgy of the flanges to be sealed, and the degree of chemical resistance desired from the metal gasket core. However, the design of the present invention provides for fail safe gasket performance even if a difference exists between the physical properties of the core gasket material and the surfaces to be sealed. For example, the gasket of the instant invention can accommodate differing thermal expansivities existing between the gasket core material and, e.g., the pipe flange metal.

In one preferred embodiment, the graphite material is a "FlexiCarb ®" or "Calgraph ®" expanded graphite which is then adhesively affixed to a "Mylar" material having a double-sided coating of a pressure sensitive adhesive material. It is preferred to employ a nuclear grade, 99% pure graphite (carbon) minimum, having no binders or resins, and having less than 50 parts per million leachable chloride and/or fluoride content. The graphite/Mylar laminate is then affixed to the exterior of the functionally corrugated gasket ring. The graphite material preferably conforms to, and maintains the corrugation contour, and extends beyond the inside and the outside edges of the core ring gasket to completely encapsulate the core gasket in the graphite material.

A preferred embodiment of the present invention concerns a gasket system for petrochemical pipeline flanges. The gasket system is especially suited for use on pipeline connections subject to high temperatures and thermal cycling. The gasket system is also beneficial in pipeline connections which are subject to exposure to caustic, corrosive materials, or otherwise subject to hostile environments.

In another preferred embodiment of the present invention, a method is provided for manufacture of a fail-safe petrochemical flange seal.

In yet another preferred embodiment, there is disclosed a ring gasket comprising a plurality of parallel, laterally spaced, functional corrugations embedded within an expanded graphite sheet, such that the external surface of the graphite sheet maintains the contour of the functional corrugations.

In yet another preferred embodiment, the functional corrugations are circular.

In another preferred embodiment, there is disclosed a gasket comprising an array of circular, concentric, radially spaced, metallic functional corrugations sandwiched between layers of expanded graphite in sealed, coaxial relation such that the expanded graphite layers maintain the contour of the functional corrugations.

In yet another preferred embodiment, there is disclosed a gasket comprising an array of separate, circular, concentric, radially spaced, metallic functional corrugations sandwiched between layers of expanded graphite in sealed, coaxial relation such that the expanded graphite layers maintain the contour of the functional corrugations.

While the invention will be described in conjunction with specific embodiments thereof, it will be understood that it is not intended to limit the invention to that embodiment and procedure. On the contrary, it is intended to cover all alternatives, modifications and equivalents as may be included within the spirit of the invention as defined by the appended claims.

DETAILED DESCRIPTION OF THE PREFERRED EMBODIMENTS

Figure 1:
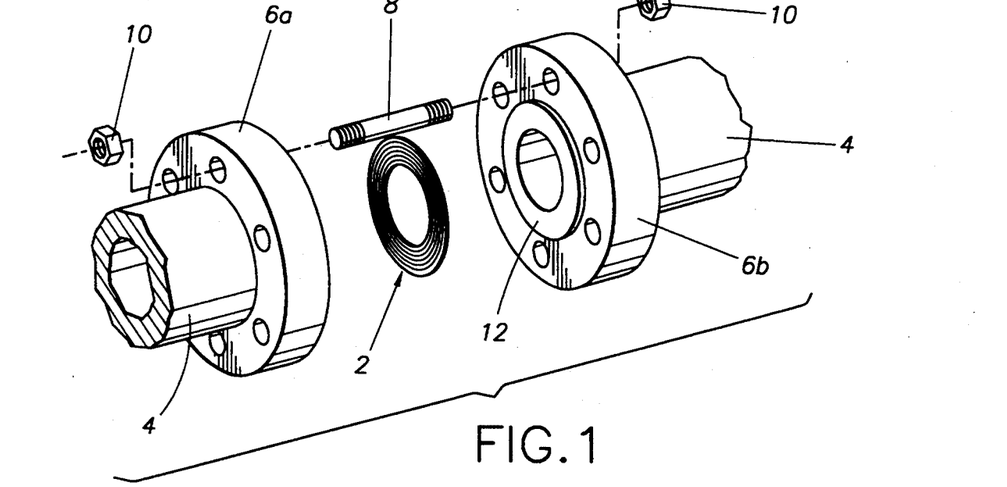
FIG. 1 shows an exploded view of an exemplary corrugated, graphite encapsulated gasket in accordance with a preferred embodiment of the present invention employed between two flange surfaces.

Referring to FIG. 1, there is shown an exploded view of a pipeline connection employing an exemplary ring gasket 2 in accordance with a preferred embodiment of the present invention. This exemplary gasket 2 can be employed in a pipeline 4 between two flange surfaces 6a and 6b which are secured together using standard techniques, such as with threaded shafts or bolts 8 and nuts 10 to create a fail-safe, multi-sealed connection in a pipeline utilized in, for example, the petrochemical industry. As illustrated here, the flange surfaces can be in a raised configuration 12; a recessed or confined joint configuration (not shown); a flat configuration (not shown); or any other flange connection employed in the industry. Furthermore, the raised flange surface 12 (or other flange sealing surface) may be of a smooth, polished finish; a rough, RMS finish; or have scratches, pitting and other wear as may result from prior use.

It will be apparent to those skilled in the art that other suitable configurations could employ the gaskets of the instant invention, for example, a heat exchanger head and an internal combustion engine head, to name a few.

Figure 2:
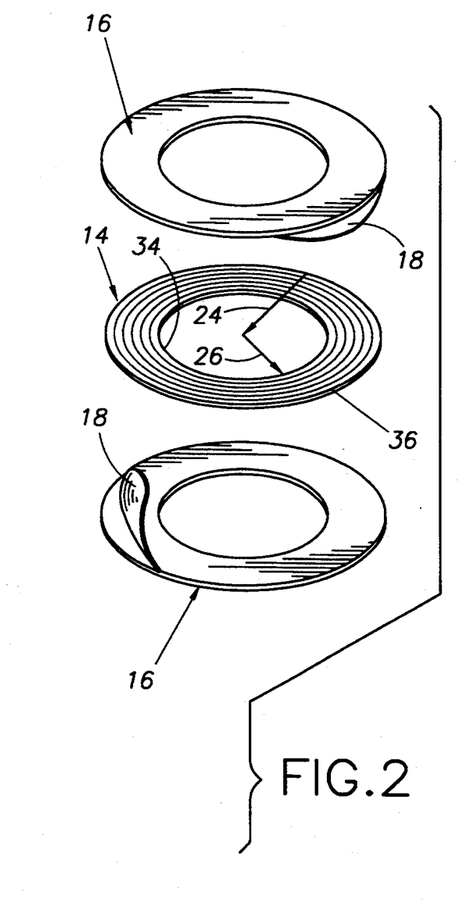
FIG. 2 shows a plan view of an exemplary corrugated gasket prior to encapsulation with a graphite material, such as an expanded graphite with adhesive backing, employed in a preferred embodiment of the present invention.

FIG. 2 shows a plan view of an exemplary functionally corrugated gasket 14 prior to encapsulation with a graphite material 16, such as an expanded graphite with adhesive backing 18 employed in a preferred embodiment of the present invention. The article of the present invention can be generally described as a functionally corrugated ring gasket core 14 which has been encapsulated by a graphite material 16, such as, the flexible expanded graphite material sold under the names "Grafoil®," "Calgraph®," "Flexicarb®", or "Sigraflex®" (Sigri GmbH). The functionally corrugated gasket ring 14 itself is typically constructed of metal material, preferably stainless steel. The selection of the metal depends upon the metallurgy of the flanges (or other surfaces) to be sealed, and the degree of chemical resistance desired from the metal gasket core.

Figure 3A:
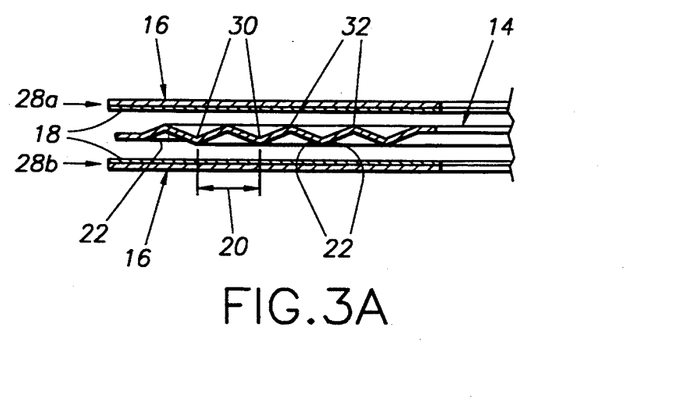
FIG. 3A shows a partial cross-sectional view of an exemplary corrugated gasket prior to encapsulation with a graphite material, such as an expanded graphite with adhesive backing, employed in a preferred embodiment of the present invention.
Figure 3B:
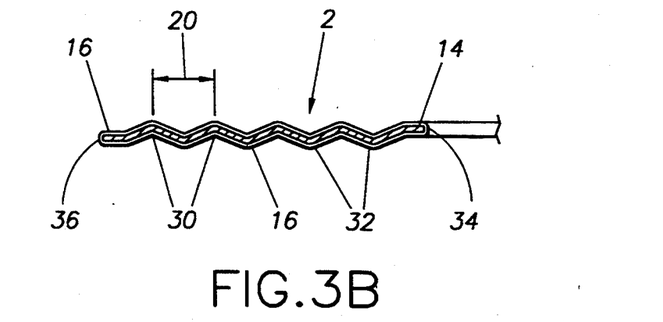
FIG. 3B shows a partial cross-sectional view of an exemplary corrugated gasket after encapsulation with a graphite material, such as an expanded graphite with adhesive backing, employed in a preferred embodiment of the present invention.

FIG. 3A shows a partial cross-sectional view of an exemplary functionally corrugated gasket 14 prior to encapsulation with a graphite material 16, such as an expanded graphite with adhesive backing 18 employed in a preferred embodiment of the present invention. FIG. 3B shows a partial cross-sectional view of an exemplary functionally corrugated gasket of the present invention 2 after encapsulation of the core 14 with a graphite material 16, such as an expanded graphite with adhesive backing 18 employed in a preferred embodiment of the present invention. FIGS. 3A and 3B illustrate the preferred "V-inverted V" shaped functional corrugation.

Figure 4:
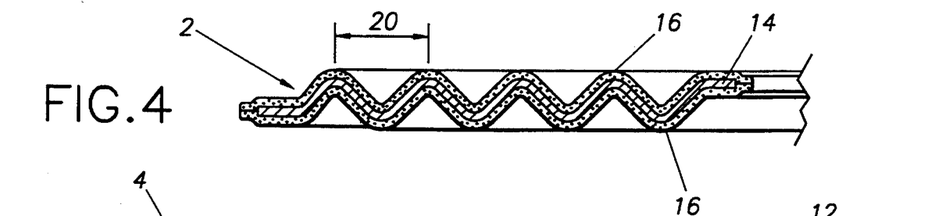
FIG. 4 shows a partial cross-sectional view of an exemplary corrugated gasket after encapsulation with a graphite material, such as an expanded graphite with adhesive backing, employed in another preferred embodiment of the present invention.

FIG. 4 shows a partial cross-sectional view of an exemplary functionally corrugated gasket 2 after encapsulation with a graphite material, such as an expanded graphite 16 with adhesive backing 18 employed in another preferred embodiment of the present invention. In this alternative preferred embodiment, the functional corrugations are of a sinusoidal pattern.

Referring again to FIGS. 1, 2, 3A and 3B, an exemplary ring gasket 2 of this invention was constructed for use in a 3-inch, 150 lb raised pipe flange, such as that illustrated in FIG. 1. In this configuration, the gasket is preferably designed to cover substantially the entire surface of the raised flange 12. In this embodiment, the raised face flange dimensions are, 5-3/8 inches O.D. ×3¼ inches I.D. The exemplary ring gasket 2 was constructed from a 0.018-inch 304 stainless steel core 14 that was functionally corrugated such as illustrated in FIGS. 2, 3A and 3B, and entirely encapsulated in graphite 16. In this embodiment, the preferred corrugation width 20 is 5/32 inch, and is defined as the distance between adjacent ridges, peaks or apexes 32. Furthermore, in this embodiment, the preferred corrugation angle or pitch 22 is 45°.

This exemplary flange ring gasket was manufactured in accordance with the following method:

(1) The 0.018-inch thick (uncorrugated) 304 stainless steel was cut to a square size having a diagonal length at least equal to the desired gasket O.D. minus one-eighth inch.; thus, the diagonal length was at least 5-2/8 inches.

(2) The square of 0.018-inch steel was then center punched (not shown).

(3) The square was then circle-sheared to cut out a circle (not shown) having a diameter equal to ⅛ of an inch less than the desired gasket O.D.; thus, the diameter of this circle was 5-2/8 inches.

(4) The 0.018-inch thick, 5-2/8 inch diameter circle was then functionally corrugated, using a spinning roller system (not shown) to create the preferred "V"-shaped corrugations illustrated in FIGS. 3A and 3B having the preferred corrugation width 20 of 5/32 inch and the preferred corrugation angle 22 of 450. In this preferred embodiment, the functional corrugations are designed to form a plurality of concentric, circular, parallel rings defined by the ridges, peaks or apexes 32 and the hollows, troughs or valleys 30, which, in the case of a pipeline flange gasket 2, are parallel to the circumferential inner border 34 and outer border 36 of the gasket core 14.

(5) The now functionally corrugated, 5-2/8 inch diameter circle was again circle-sheared to cut out an inner circle, thereby leaving a ring 14 having an outer diameter 24 of 5-2/8 inches, and an inner diameter 26 of ⅛ inch greater than the desired gasket I.D.; thus, the inner diameter 26 of the functionally corrugated stainless steel ring 14 was 3-5/8 inches in diameter.

(6) Expanded graphite sheet material 16 (preferably the 0.015" thick "Calgraph®" or "Flexicarb" expanded graphite sheet) was obtained, and a pressure sensitive double sided adhesive 18 (preferably "Mylar" backed, 0.002" thick) was applied to the expanded graphite material 16. The double sided adhesive 18 typically is available in sheets containing quick-release, peel-off layers on both sides to protect the adhesive until use.

(7) The expanded graphite/adhesive composite was then die stamp cut with a Rule Steel die (not shown) having the actual desired gasket diametrical dimensions 24 and 26 (here, 5-⅜ inches O.D.×3¼ inches I.D.) to create two matching ring-shaped graphite/adhesive laminates 28a and 28b.

(8) The functionally corrugated metal core 14 was then encapsulated with the expanded graphite by laminating and molding both sides of the core material 14 with the thus formed laminate layers of 0.017-inch thick adhesive-backed expanded graphite 28a and 28b. A first ring-shaped laminate layer, e.g., 28a, was symmetrically and proportionally aligned with the metal core 14 such that 1/16 inch of the laminate 28a extends over both the inner and outer edges of the metal core. Sufficient pressure was applied to the first laminate layer 28a to adhere it to the core and to maintain such alignment with the core 14 until the second laminate layer 28b was applied. The second laminate layer 28b was applied in similar fashion to the opposite face of the metal core 14.

(9) The now laminated gasket 2 is then placed between two foam/cloth padded rollers (not shown), compression is applied to the rollers, and the gasket 2 is rotated around the rollers in circular fashion to mold and compress the adhesive-backed graphite laminates 28a and 28b into the individual functional corrugations (i.e., the area defined by the ridges, peaks or apexes 32 and the hollows, troughs or valleys 30), such that the graphite layers 28a, 28b preferably adhere to substantially the entire surface of the functionally corrugated core 14 and maintain the contour of the functional corrugations. A flexible foam pad, or other suitable device could likewise be utilized to massage and compress the graphite laminate layers 28a, 28b into the functional corrugation profile.

(10) Pressure is next applied to the 1/16th inch overlap of the graphite laminate layers 28a, 28b along the O.D. and the I.D. of the functionally corrugated metal core ring gasket 2 to seal the graphite laminate layers together thereby ensuring complete encapsulation of the core material with graphite.

As an additional step to the above-described method, it may be desirable to apply heat to the now graphite encapsulated gasket surface sufficient to carbonize the Mylar or other suitable backing of the expanded graphite laminate layer.

Referring now to FIGS. 5A-5D, there is illustrated an application of a preferred embodiment of an exemplary gasket employed in a raised flange pipeline connection.

Figure 5A:
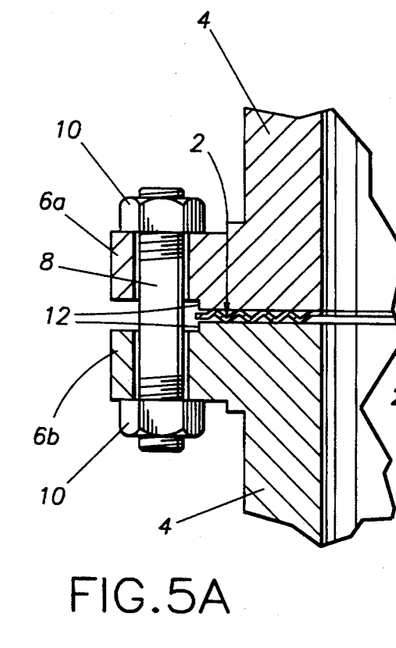
FIG. 5A shows a partial cross-sectional view of an exemplary corrugated, graphite encapsulated gasket in accordance with a preferred embodiment of the present invention, employed between two flange surfaces prior to compression loading.
Figure 5B:
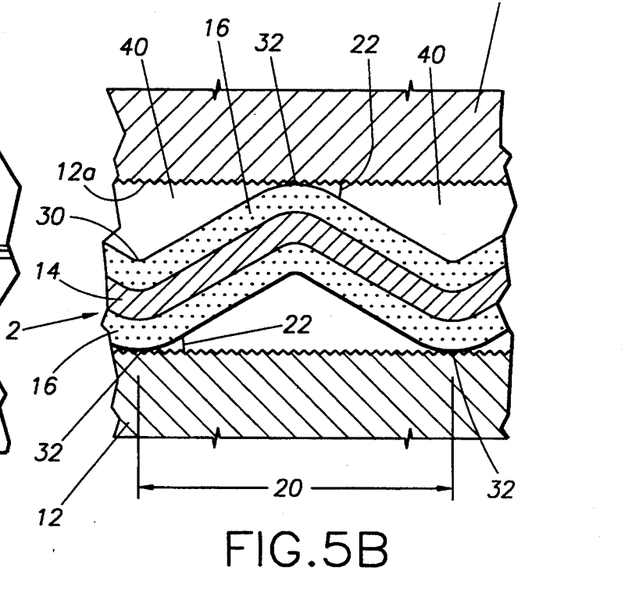
FIG. 5B shows an enlarged partial cross-sectional view of an exemplary corrugated, graphite encapsulated gasket in accordance with a preferred embodiment of the present invention employed between two flange surfaces prior to compression loading.

In particular, FIG. 5A shows a partial cross-sectional view of an exemplary functionally corrugated, graphite encapsulated gasket 2 in accordance with a preferred embodiment of the present invention employed between two flange surfaces 6a, 6b prior to compression loading. FIG. 5B shows an enlarged, partial cross-sectional view of the same. In this example, the raised flange face 12 has a rough, serrated, or RMS finish 12a. The corrugation width 20, as defined by the distance between adjacent ridges, peaks or apexes 32 at its original design distance, and the preferred corrugation angle 22 is 45° relative to the raised flange surfaces 12. In the uncompressed, or unloaded position, the graphite layer 16 remains a substantially uniform thickness and density over the contoured surface of the functionally corrugated core 14, engaging the flange surfaces 12 at the corrugation apex points 32 to form a plurality of independent, fluid locked, sealed chambers 40 across the surface to be sealed.

Figure 5C:
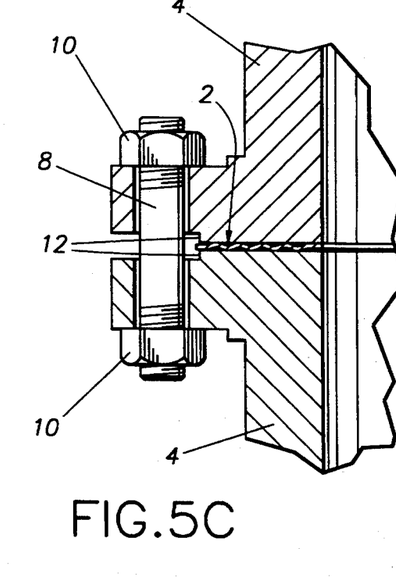
FIG. 5C shows a partial cross-sectional view of an exemplary corrugated, graphite encapsulated gasket in accordance with a preferred embodiment of the present invention employed between two flange surfaces during compression loading.
Figure 5D:
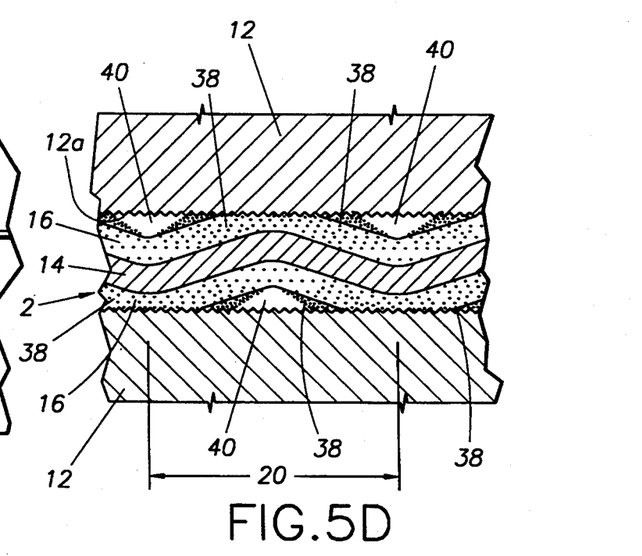
FIG. 5D shows an enlarged partial cross-sectional view of an exemplary corrugated, graphite encapsulated gasket in accordance with a preferred embodiment of the present invention employed between two flange surfaces during compression loading.

FIG. 5C shows a partial cross-sectional view of an exemplary functionally corrugated, graphite encapsulated gasket 2 in accordance with a preferred embodiment of the present invention employed between two flange surfaces 6a, 6b during compression loading. FIG. 5D shows an enlarged partial cross-sectional view of the same. The graphite encapsulated functionally corrugated ring gasket 2 shown in FIGS. 5C and 5D has been installed into a pipeline flange 6a, 6b, with a relatively minimal torque (such as 30 ft-lbs for a 3", 150 lb flange) applied to the flange bolts sufficient to urge and compress the gasket into a "loaded" static position between the now closer adjacent flange surfaces 12. As the flange connection is tightened, and the flange surfaces move toward one another, the corrugation distance 20 increases, while the corrugation angle 22 decreases. This loading action sets the ring gasket's multiple apex sealing faces 32 into fail-safe sealing relation with the flange surfaces 12. In the loaded position, the functional corrugations on both faces of the ring gasket form a plurality of parallel, fluid-locked, concentric barriers or chambers 40 to prevent leakage of the flanged pipe connection during operation. In the compressed or loaded state, the gasket of this invention energizes the multiple apex sealing faces 32 by creating zones of increased graphite density 38 surrounding the multiplex of concentric apex sealing faces 32. The graphite densification may substantially fill or saturate the now decreased barrier zone 40 creating essentially a series of independent, back-to-back rings of highly densified graphite over the entire surface of the flange seal. Thus, in this static, loaded position, the seal is in an energized mode, creating a multiplicity of parallel, fluid-locked, concentric barriers or chambers 40 to ensure fail-safe seal operation.

Referring again to FIGS. 2, 3A and 3B, as the energized ring gasket 2 of the instant embodiment is subjected to temperatures in excess of the temperature stability point of the "Mylar" backing of the adhesive layer 18 of the graphite laminate 16, such layer becomes carbonized, thereby becoming part of the gasket.

Referring again to FIGS. 5C and 5D, as the flange connection 6a, 6b, becomes subjected to thermal excursions, cycling or shock, the flange connection, and the energized, functionally corrugated seal multiplex gasket system 2 contained therebetween are expected to encounter thermal expansion and contraction. However, unlike the gasket systems heretofore existing in the art, this energized, multi-chambered gasket 2 utilizes the interactive relationship formed by the combination of the functionally corrugated core 14, the now zone-densified graphite encapsulation 16 and the flange surfaces 12 to maintain fail-safe sealing of the flange connection before, during, and after exposure to thermal cycling events. Thus, it has been found that this novel gasket system can achieve fail-safe sealing with only a fraction of the previously required torque, and further dispenses with the need to frequently tighten the flange connections to maintain positive sealing during operational conditions. Furthermore, it has been found that this novel gasket system maintained the required pressure and allowed no measurable leakage when exposed to the fire test conditions of the American Petroleum Institute Standard 607, and further passed hydrostatic testing after cool-down from a series of thermal cycles.

It will be apparent to those skilled in the art that other suitable mechanical means may be employed for creating the functional corrugations on the gasket cores 14 employed for gaskets of the present invention. For example, in addition to the preferred spinning roller method utilized to create the functional corrugations, milling, molding, stamping and other techniques may be employed to create the functional corrugations. It will likewise be apparent to those skilled in the art that other suitable functional corrugation shapes may be employed for creating the functional corrugations on the gaskets. For example, in addition to the preferred "V"-shaped functional corrugations shown in FIGS. 3A-3B, and 5A–5D, and the preferred sinusoidal shaped functional corrugations shown in FIG. 4, any functional corrugation shape giving the material to be corrugated an increased resiliency, ductility, memory, and springiness could be employed. Furthermore, the circumferential shape of the gasket of this invention is not limited to that of a circle. While a circular ring shape 2 is the preferred gasket shape for use on a pipe flange, other gasket shapes can be manufactured depending on the shape of the surfaces to be sealed. Furthermore, although FIGS. 1, 5A and 5C illustrate a preferred gasket of this invention being utilized in a raised flange pipeline connection, other variations of this gasket are possible to accommodate differing flange connection scenarios. For example, a pipeline flange gasket of the instant invention can be employed where the flange connection requires the gasket to extend diametrically beyond the flange bolt holes.

Furthermore, other graphite products can be employed, such as, the 0.015-inch thick "Grafoil ®" product which is available with a 0.002-inch "Mylar" adhesive layer on one side. Still further, other means are available for adhering the graphite to the functionally corrugated core, such as by compression molding techniques, or other adhesive techniques. However, the preferred method of coating a corrugated core is the adhesive laminate technique described herein so that damage to the integrity of the graphite layer is avoided when compressing the graphite into the corrugations and when compressing the gasket into its loaded position. Furthermore, although a "Mylar" material with pressure sensitive adhesive on both sides is preferred for its temperature stability, and carbonization characteristics, other suitable adhesives could be employed.

As described above, the preferred uncorrugated core metal thickness is 0.018 inch, the preferred corrugation peak width was 5/32-inches (for a 3", 150 lb flange), and the preferred corrugation angle was 45°. However, it is within the scope and spirit of this invention that other variations exist, such as, core material thickness ranges of 0.010–0.030 inches; and graphite layer thickness variations of 0.015–0.030-inch (with an additional 0.002-inch adhesive). For example, in pipe flange connections having ¼" to 1-¼" flange face widths, it is preferred that the functional corrugation width 20 be 5/32". For pipe flange face widths of 1-¼" to 2", the preferred corrugation width 20 is 3/16". For pipe flange face widths of 2" and greater, the preferred corrugation width 20 is ¼".

Application of exemplary gaskets made in accordance with the present invention will be widespread throughout the petrochemical industry. Depending on the metallurgy of the flange connections, the degree of corrosion resistance desired, and the pressure and temperature constraints of each given application, a broad range of gaskets can be manufactured according to the present invention to suit the specific requirements of each application. For example, in a preferred embodiment of this invention, exemplary gaskets of this invention can be manufactured from 0.018 inch thick sheet metal. In this exemplary configuration, the metallurgy of the functionally corrugated core gasket can impact the optimum maximum gasket operational temperature range. For example, as set forth in TABLE I, various metals can be employed in the manufacture of this gasket resulting in a range of conservative suggested maximum operational temperatures when utilized in the above-mentioned preferred gasket embodiment. The suggested maximum operational temperature ranges are conservatively based on the temperature limitations of the bare metal. Thus, it is anticipated that the design of the gasket of the instant invention will allow fail-safe performance at temperatures exceeding the suggested maximums of the core gasket material.

TABLE I

| METAL TYPE | SUGGESTED MAXIMUM METAL TEMP. (°F.) |
| --- | --- |
| Carbon Steel | 1000 |
| 304 S.S. | 1700 |
| 309 S.S. | 2000 |
| 310 S.S. | 2100 |
| 316 S.S. | 1700 |
| 321 S.S. | 1700 |
| 347 S.S. | 1700 |
| 410 S.S. | 1300 |
| 430 S.S. | 1500 |
| 501 S.S. | 1200 |
| Alloy 20 | 1500 |
| Aluminum | 800 |
| Brass | 500 |
| Copper | 500 |
| Hastelloy B & C | 2000 |
| Inconel 600 | 2000 |
| Inconel 800 | 1600 |
| Monel | 1500 |
| Nickel | 1400 |
| Phosphor Bronze | 500 |
| Tantulum | 3000 |
| Titanium | 2000 |

Furthermore, the beneficial multi-sealing characteristics of the functionally corrugated, graphite encapsulated gasket of this invention also have application in irregularly-shaped configurations, such as those required for engine head gaskets, heat exchanger gaskets, or other shape requirements, such as, oval, square, rectangular, elliptical, oblong, and/or epicycloid shaped gaskets, and/or any combination thereof.

Figure 6A:
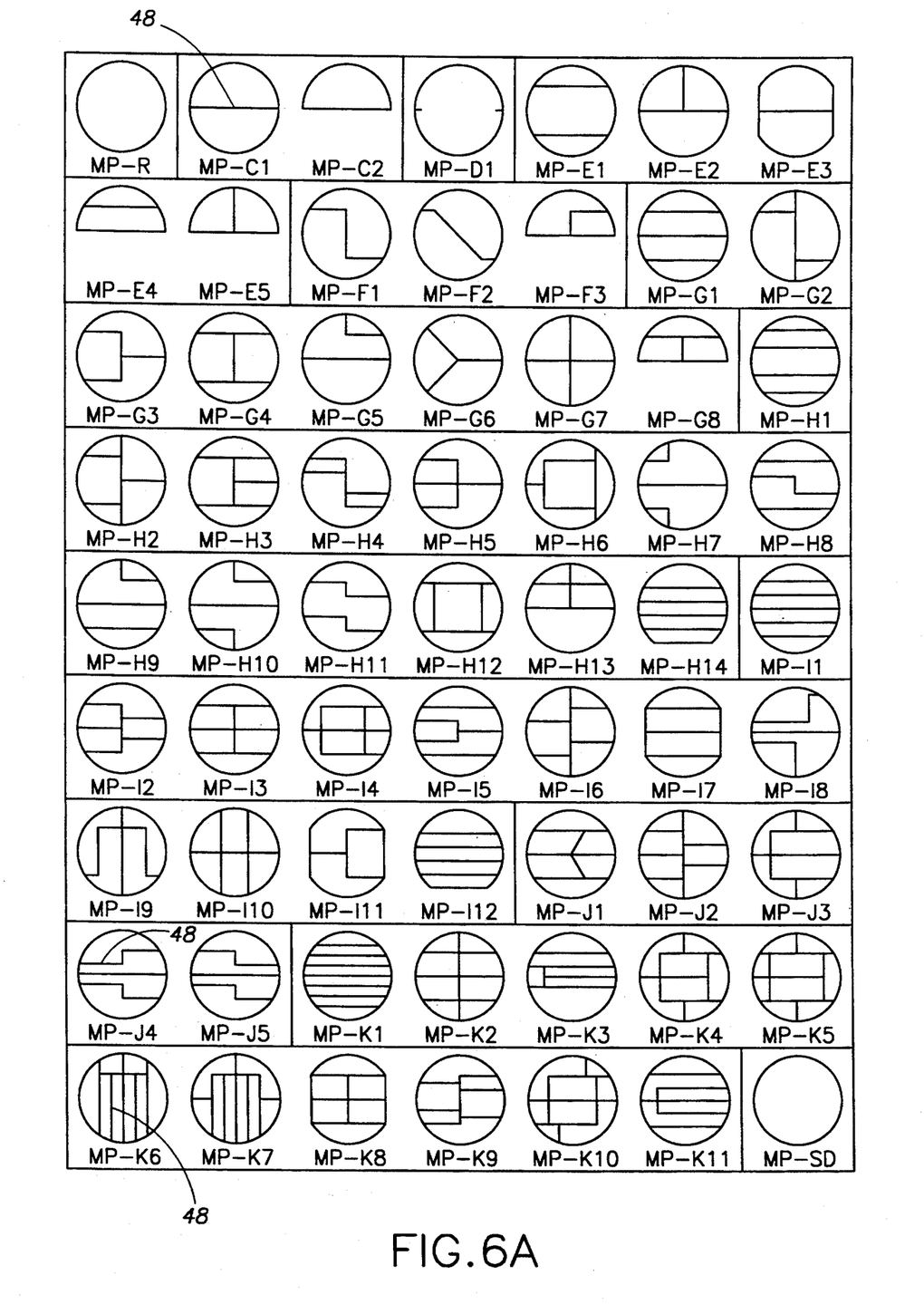
FIG. 6A shows an exemplary selection of heat exchanger gasket configurations which could employ an exemplary gasket made according to the present invention.
Figure 6B:
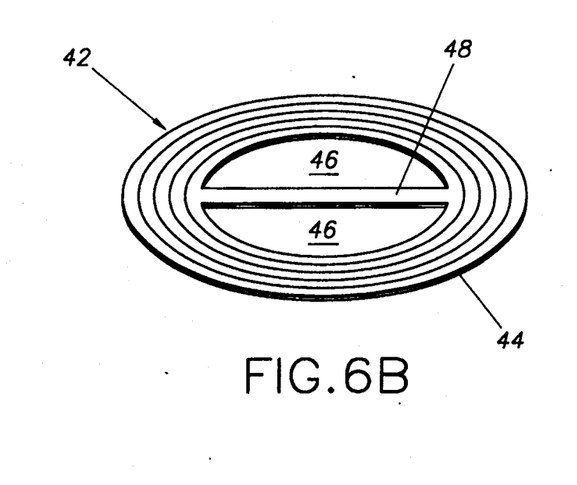
FIG. 6B shows a top view of an exemplary heat exchanger gasket made according to the present invention.
Figure 6C:
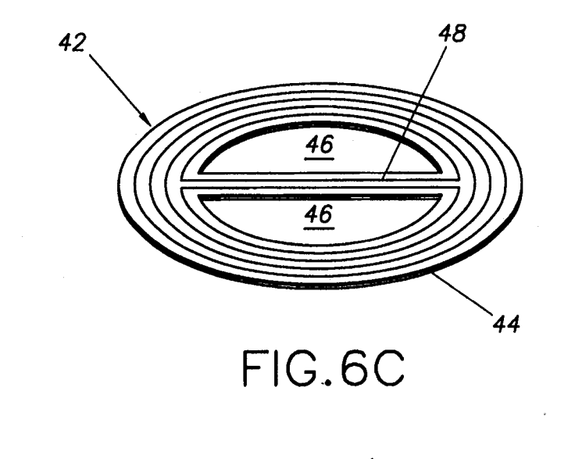
FIG. 6C shows a top view of an alternative exemplary heat exchanger gasket made according to the present invention.

For example, heat exchanger gaskets typically have a circular outer diameter and inner diameter, similar to a pipe flange gasket, but additionally contain partitioned chambers within the confines of the inner diameter area of the gasket. Referring now to FIG. 6A, there is show an exemplary selection of heat exchanger gasket configurations which could employ an exemplary gasket made according to the present invention. FIG. 6B illustrates an example of an exemplary heat exchanger gasket made in accordance with the present invention. Thus, similar to the method described above, in another preferred embodiment of the present invention, a corrugated, graphite encapsulated, multi-chambered barrier heat exchanger seal 42 is created by, for example, circular shearing a desired core material, (such as 0.018-inch thick 304 stainless steel), functionally corrugating the outer diameter ring 44 of the gasket over the desired seal width, and then cutting the remainder of the core material to leave the desired seal configuration for the partitioned heat exchanger chambers 46 (as defined by one or more ribs 48) with in the confines of the inner diameter area of the gasket. The thus formed gasket 42 can then be encapsulated in graphite according to the methods of the present invention. If only the outer diameter portion of the heat exchanger gasket 44 is functionally corrugated, then it may be necessary to add additional layers of graphite to the noncorrugated rib portion of the gasket 48 prior to encapsulation to achieve a uniform seal height. Referring now to FIG. 6C, in another alternative preferred heat exchanger gasket embodiment, the rib portion 48 is functionally corrugated along with the outer diameter portion of the ring portion of the gasket 44 to create fluid-locked, parallel, laterally spaced corrugations surrounding the heat exchanger chambers 46 and extending, in parallel fashion, to the outer diameter of the gasket, as shown, or in a similar configuration.

In heat exchanger flange connections having ¼" to ⅜" flange face widths, it is preferred that the functional corrugation width 20 be ⅛". For heat exchanger flange face widths of ⅜" to 1-¼", the preferred corrugation width 20 is 5/32". For heat exchanger flange face widths of 1-¼" to 2", the preferred corrugation width 20 is 3/16". For heat exchanger flange face widths of 2" and greater, the preferred corrugation width 20 is ¼".

Figure 7:
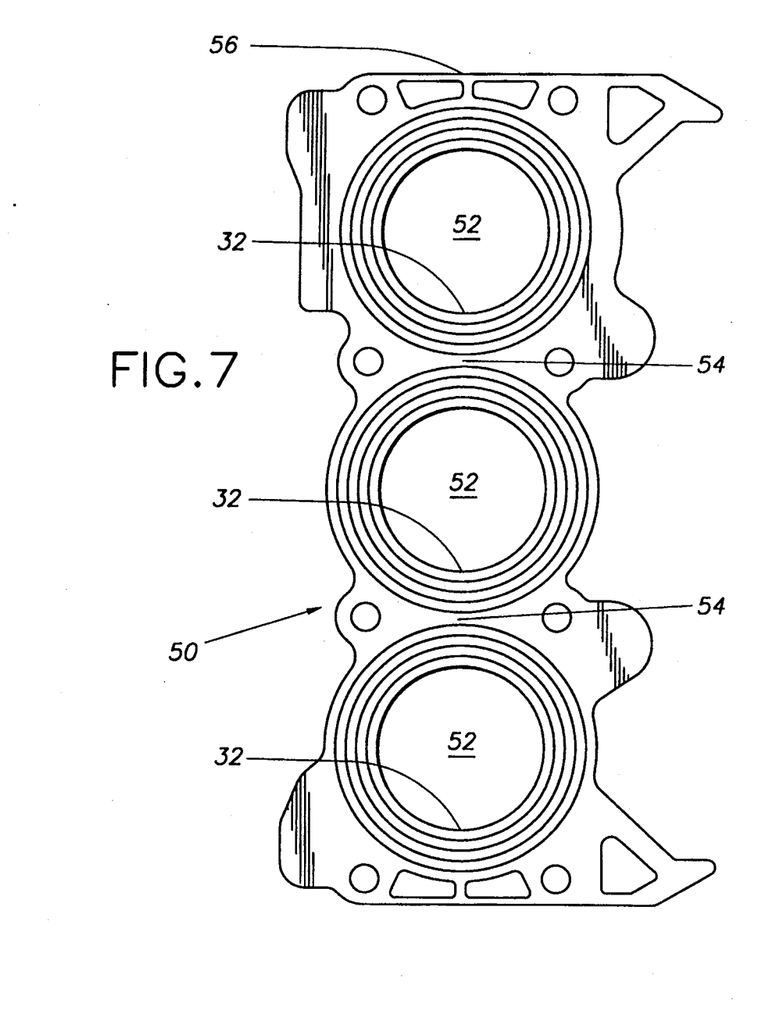
FIG. 7 shows a plan view of an exemplary engine head gasket in accordance with the present invention.

In yet another alternative preferred embodiment of the invention, an internal combustion engine cylinder gasket, 50, such as that generally depicted in FIG. 7, is manufactured to utilize a functionally corrugated, graphite encapsulated gasket by creating a series of functional corrugations surrounding, in parallel fashion, piston chamber openings 52. Each piston chamber 52 has at least one functional corrugation apex 32 independently surrounding it. Depending upon the spacing between the piston chambers, the additional concentric functional corrugations surrounding one piston chamber may have a united or common apex zone 54 with the additional concentric functional corrugations surrounding another piston chamber opening, for example, in a "figure-8" configuration. In a preferred embodiment of this cylinder gasket, a sheet of 0.018–0.020 inch thick high temperature steel 56, such as, Inconel 600, is employed to create the core gasket. The desired areas of the core gasket are functionally corrugated according to the teachings herein, and any gasket openings are cut out. The core gasket is then encapsulated with a graphite material, preferably a 0.020 inch thick expended graphite employing a 0.002 inch thick Mylar backed adhesive layer, according to the present-invention. In this embodiment, higher temperature and pressure conditions can be tolerated than that presently experienced, thereby increasing the performance of the engine. This preferred engine cylinder head gasket eliminates the problems existing with the tanged metal graphite gaskets presently in use. Furthermore, the gasket of this invention eliminates the need for the flanged grommet rings or collars presently employed as a cap around the inner diameter portion of the gasket which is exposed to the piston chamber. These grommet rings are subject to failure, thereby causing gasket failure.

The above-described gasket systems, and other custom gasket configuration shapes, can be made according to the present invention by creating a die-stamp, or other mechanism, to stamp or indent, or machine sheet metal with a series of functional corrugations parallelling the opening to be sealed and covering the surface area to be sealed, and then encapsulating such custom designed functionally corrugated gasket in graphite in accordance with the present invention.

Thus it is apparent that there has been provided, in accordance with the invention, methods and articles that fully satisfy the objects, aims, and the advantages set forth above. While the invention has been described in conjunction with specific alternative embodiments thereof, it is evident that many other alternatives, modifications and variations will be apparent to those skilled in the art in light of the foregoing description. For example, while differing metallurgies have been described for use as the concentrically functionally corrugated core of the gaskets of the present invention, skilled artisans could employ other metallurgies or materials, e.g., ceramic compositions, having the desired physical-chemical properties as the core substrate of a gasket according to the present invention. Accordingly, it is intended to embrace all such alternatives, modifications and variations as fall within the spirit and broad scope of the appended claims.

I claim:

1. A gasket for sealing between two substantially parallel surfaces, comprising:

a core member defining an aperture therein and having a plurality of concentric corrugations of uniform height formed around said aperture, wherein an inner edge portion of said core member immediately surrounding the aperture extends substantially parallel to the surfaces to be sealed, and wherein an outer edge portion of said core member extends substantially parallel to the surfaces to be sealed;

a first non-asbestos coating layer disposed adjacent one side face of the core member to follow the contour thereof, said first coating layer extending beyond said inner edge portion and said outer edge portion of said core member; and a second non-asbestos coating layer disposed adjacent the other side face of the core member to follow the contour thereof, said second coating layer extending beyond said inner edge portion and said outer edge portion of said core member;

wherein the portions of said first and second coating layers extending beyond the inner and outer edge portions of the core member are joined so as to completely encapsulate the core member;

wherein a plurality of concentric, continuous densification zones are formed in each of the first and second coating layers corresponding to said plurality of concentric functional corrugations when the gasket is placed under pressure between the surfaces to be sealed; and wherein said first and second coating layers comprise expanded graphite.

2. The gasket as claimed in claim 1, wherein the aperture and the concentric corrugations are circular.

3. A gasket for sealing between two substantially parallel surfaces, comprising:

a core member defining an aperture therein, wherein an inner edge portion of said core member immediately surrounding the aperture extends substantially parallel to the surfaces to be sealed, and wherein an outer edge portion of said core member extends substantially parallel to the surfaces to be sealed;

a first non-asbestos coating layer disposed adjacent one side face of the core member to follow the contour thereof, said first coating layer extending beyond said inner edge portion and said outer edge portion of said core member;

a second non-asbestos coating layer disposed adjacent the other side face of the core member to follow the contour thereof, said second coating layer extending beyond said inner edge portion and said outer edge portion of said core member; and concentric sealing means of uniform height formed on said core member around the aperture for creating a plurality of concentric barrier seals in each of the first and second coating layers, each said barrier seal being defined by a continuous densification zone in one of the first and second coating layers when the gasket is placed under pressure between the surfaces to be sealed;

wherein the portions of said first and second coating layers extending beyond the inner and outer edge portions of the core member are joined so as to completely encapsulate the core member; and wherein said first and second coating layers comprise expanded graphite.

4. The gasket as claimed in claim 3, wherein the aperture and the concentric barrier seals are circular.

5. A gasket for sealing between two substantially parallel surfaces, comprising:

a core member defining an aperture therein and having a plurality of concentric corrugations of uniform height defining a plurality of peaks and valleys formed around said aperture, wherein an inner edge portion of said core member immediately surrounding the aperture extends substantially parallel to the surfaces to be sealed, and wherein an outer edge portion of said core member extends substantially parallel to the surfaces to be sealed; and means for creating concentric barrier seals defined by at least one continuous densification zone in each of the first and second coating layers within a valley of said corrugations when the gasket is placed under pressure between the surfaces to be sealed, said means comprising:

a first non-asbestos coating layer disposed adjacent one side face of the core member so as to follow the contour thereof, said first coating layer extending beyond said inner edge portion and said outer edge portion of said core member; and a second non-asbestos coating layer disposed adjacent the other side face of the core member so as to follow the contour thereof, said second coating layer extending beyond said inner edge portion and said outer edge portion of said core member;

wherein the portions of said first and second coating layers extending beyond the inner and outer edge portions of the core member are joined so as to completely encapsulate the core member; and wherein said first and second coating layers comprise expanded graphite.

6. The gasket as claimed in claim 5, wherein the aperture and the concentric corrugations are circular.

* * * * *

UNITED STATES PATENT AND TRADEMARK OFFICE
CERTIFICATE OF CORRECTION

PATENT NO.   : 5,421,594

DATED        : June 6, 1995

INVENTOR(S)  : Abel R. Becerra

It is certified that error appears in the above-identified patent and that said Letters Patent is hereby corrected as shown below:

Column 5, lines 28 and 29; replace the word "densifted" and with --densified--.

Column 5, line 67; replace the word "densifted" with --densified--.

Column 6, line 17; replace the word "correction" with --connection--.

Column 10, line 8; replace the fraction "3¼" with --3½--.

Column 10, line 26; replace the fraction "3/8" with --1/8--.

Column 10, line 34; replace the numeral "450" with --45°--.

Column 10, line 61; replace the fraction "3¼" with --3½--.

Column 15, line 37; delete the hyphen between the words "present" and "invention".

Column 16, line 38; delete the word "functional".

Signed and Sealed this

Tenth Day of October, 1995

Attest:

BRUCE LEHMAN

Attesting Officer

Commissioner of Patents and Trademarks